United States Patent
Feinaeugle

(10) Patent No.: US 10,127,163 B2
(45) Date of Patent: Nov. 13, 2018

(54) CONTROL DEVICE FOR CONTROLLING A SAFETY DEVICE, AND USE OF AN IO LINK FOR TRANSMISSION OF A SAFETY PROTOCOL TO A SAFETY DEVICE

(71) Applicant: Balluff GmbH, Neuhausen a. d. F (DE)

(72) Inventor: Albert Feinaeugle, Wildberg (DE)

(73) Assignee: Balluff GmbH, Neuhausen a. d. F (DE)

( * ) Notice: Subject to any disclaimer, the term of this patent is extended or adjusted under 35 U.S.C. 154(b) by 0 days.

(21) Appl. No.: 14/400,914

(22) PCT Filed: May 8, 2013

(86) PCT No.: PCT/DE2013/000255
§ 371 (c)(1),
(2) Date: Nov. 13, 2014

(87) PCT Pub. No.: WO2013/170845
PCT Pub. Date: Nov. 21, 2013

(65) Prior Publication Data
US 2015/0134856 A1 May 14, 2015

(30) Foreign Application Priority Data
May 14, 2012 (DE) .................. 10 2012 009 494

(51) Int. Cl.
*G06F 3/00* (2006.01)
*G06F 13/12* (2006.01)
*G05B 19/042* (2006.01)
*G06F 13/42* (2006.01)

(52) U.S. Cl.
CPC ....... *G06F 13/122* (2013.01); *G05B 19/0425* (2013.01); *G06F 13/4221* (2013.01); *G06F 13/126* (2013.01)

(58) Field of Classification Search
None
See application file for complete search history.

(56) References Cited

U.S. PATENT DOCUMENTS

| 7,496,707 | B2 | 2/2009 | Freking et al. |
| 7,668,990 | B2 | 2/2010 | Krzyzanowski et al. |
| 7,870,299 | B1 * | 1/2011 | Sorensen ............ G06F 11/1004 710/2 |
| 8,814,233 | B2 | 8/2014 | Leska et al. |
| 9,244,454 | B2 | 1/2016 | Neupärtl et al. |

(Continued)

FOREIGN PATENT DOCUMENTS

| CN | 1591250 A | 3/2005 |
| CN | 1802612 A | 7/2006 |

(Continued)

OTHER PUBLICATIONS

International Search Report of PCT/DE2013/000255, dated Oct. 22, 2013.

(Continued)

*Primary Examiner* — Henry Tsai
*Assistant Examiner* — Christopher A Bartels
(74) *Attorney, Agent, or Firm* — Collard & Roe, P.C.

(57) ABSTRACT

A control device for controlling a safety device which can be connected to a master assembly by means of an IO link is characterized in that a safety protocol can be transmitted via an IO link connection.

14 Claims, 2 Drawing Sheets

(56) References Cited

U.S. PATENT DOCUMENTS

| | | | |
|---|---|---|---|
| 2004/0107265 A1* | 6/2004 | Yasunaga | G06F 13/1673 709/213 |
| 2004/0230323 A1* | 11/2004 | Glanzer et al. | 700/18 |
| 2004/0260405 A1 | 12/2004 | Eddie et al. | |
| 2006/0142876 A1 | 6/2006 | Kalhoff et al. | |
| 2006/0224811 A1* | 10/2006 | Sichner | G05B 19/0428 710/306 |
| 2007/0011365 A1 | 1/2007 | Jurisch et al. | |
| 2009/0083446 A1 | 3/2009 | Konieczny et al. | |
| 2009/0125666 A1 | 5/2009 | Freking et al. | |
| 2009/0276180 A1* | 11/2009 | Schneider | G01B 21/22 702/151 |
| 2010/0114334 A1* | 5/2010 | Krumsiek | G05B 19/042 700/3 |
| 2010/0146182 A1 | 6/2010 | Gutekunst et al. | |
| 2010/0019187 A1 | 7/2010 | Beyer et al. | |
| 2010/0191875 A1* | 7/2010 | Beyer | H04L 12/40006 710/30 |
| 2012/0110225 A1 | 5/2012 | Wessling et al. | |
| 2012/0210037 A1 | 8/2012 | Kiesel et al. | |
| 2012/0296446 A1* | 11/2012 | Neupartl | G05B 19/0428 700/1 |
| 2013/0111087 A1* | 5/2013 | Kaufleitner | H04L 63/16 710/106 |
| 2013/0222123 A1 | 8/2013 | Wessling | |
| 2014/0214232 A1 | 7/2014 | Koppmann et al. | |
| 2014/0336792 A1* | 11/2014 | Stamberg et al. | 700/79 |
| 2015/0121507 A1* | 4/2015 | Haija | G06F 21/44 726/17 |

FOREIGN PATENT DOCUMENTS

| | | |
|---|---|---|
| CN | 101124530 A | 2/2008 |
| CN | 101132361 A | 2/2008 |
| CN | 1011244530 A | 2/2008 |
| CN | 101562559 A | 10/2009 |
| CN | 101826966 A | 9/2010 |
| CN | 201837860 U | 5/2011 |
| DE | 102 59 391 A1 | 7/2004 |
| DE | 10 2004 015 227 A1 | 10/2005 |
| DE | 10 2008 038 417 A1 | 2/2010 |
| DE | 10 2008 062 851 B3 | 4/2010 |
| DE | 10 2008 060 004 B4 | 5/2010 |
| DE | 10 2008 060 006 B4 | 5/2010 |
| DE | 10 2009 013303 A1 | 9/2010 |
| DE | 20 2008 017 894 U1 | 10/2010 |
| DE | 10 2010 038 457 A1 | 2/2012 |
| DE | 10 2011 081 766 A1 | 2/2013 |
| EP | 1 884 844 A1 | 2/2008 |
| EP | 2 161 638 A1 | 3/2010 |
| EP | 2 187 278 A1 | 5/2010 |
| EP | 2 211 523 A1 | 7/2010 |
| GB | 2 403 042 A | 12/2004 |
| WO | 2011/047772 A1 | 4/2011 |

OTHER PUBLICATIONS

International Search Report of PCT/DE2013/000280, dated Sep. 11, 2013.
International Search Report of PCT/DE2013/000270, dated Oct. 22, 2013.
IEC 61131-9, International Standard, "Programmable controllers—Part 9: Single-drop digital communication interface for small sensors and actuators (SDCI)," Edition 1.0, Sep. 2013, total of 576 pages.
Profibus Nutzerorganisation E.V. PNO, "PROFIsafe System Description Technology and Application", Internet Citation, Nov. 2010, pp. 1-26.
ISO 15745-1, Industrial automation systems and integration—Open systems application integration framework—Part 1: Generic reference description, First edition Mar. 1, 2003.
ISO 15745-1, Industrial automation systems and integration—Open systems application integration framework—Part 1: Generic reference description, First edition Mar. 1, 2003, Amendment 1 (Apr. 1, 2007).
ISO 15745-2, Industrial automation systems and integration—Open systems application integration framework—Part 2: Reference description for ISO 11898-based control systems, First edition Nov. 15, 2003.
ISO 15745-3, Industrial automation systems and integration—Open systems application integration framework—Part 3: Reference description for IEC 61158-based control systems, First edition Nov. 15, 2003.
ISO 15745-4, Industrial automation systems and integration—Open systems application integration framework—Part 4: Reference description for Ethernet-based control systems, First edition Nov. 15, 2003.
ISO 15745-4, Industrial automation systems and integration—Open systems application integration framework—Part 4: Reference description for Ethernet-based control systems, First edition Nov. 15, 2003, Amendment 1: PROFINET profiles (Feb. 15, 2006).
ISO 15745-4, Industrial automation systems and integration—Open systems application integration framework—Part 4: Reference description for Ethernet-based control systems, First edition Nov. 15, 2003, Amendment 2: Profiles for Modbus TCP, EtherCAT and Ethernet powerlink (Feb. 1, 2007).
ISO 15745-5, Industrial automation systems and integration—Open systems application integration framework—Part 5: Reference description for HDLC-based control systems, First edition Feb. 1, 2007.
Chinese Office Action in CN 201380031645.5, dated Mar. 18, 2016, with English translation.
English translation of Chinese Office Action, including Search Report, dated Apr. 19, 2016 in Chinese Application No. 201380032743.0.
German Examination Report dated Jul. 19, 2016 in German Application No. 10 2012 014 682.5, with English translation of relevant parts.
Second Chinese Office Action in CN201380032743.0, dated Dec. 30, 2016.
German Office Action dated Jun. 28, 2016 in German Application No. 10 2012 014 681.7 with English translation of relevant parts.
"IO-Link System Description—Technology and Application" downloaded from www.io-link.com, Feb. 2016, total of 20 pages.
Chinese Office Action in CN201380032745.X, dated Dec. 23, 2016.
Third Chinese Office Action in CN201380032743.0, dated Jun. 26, 2017.
Second Chinese Office Action in CN201380032745.X, dated Aug. 21, 2017.
Notification of the Office Rejection in CN 201380032743.0, dated Jul. 11, 2018.
IO-Link Communication Specification Version 1.0, Jan. 2009, cover sheet.

* cited by examiner

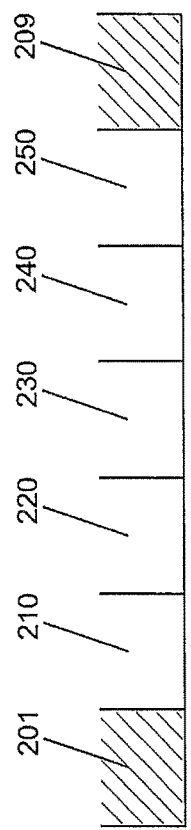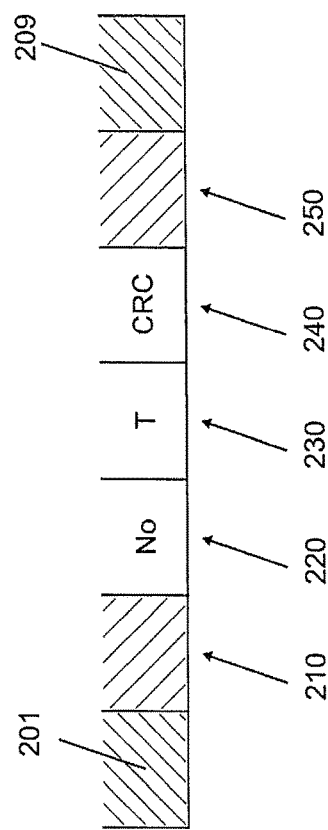

CONTROL DEVICE FOR CONTROLLING A SAFETY DEVICE, AND USE OF AN IO LINK FOR TRANSMISSION OF A SAFETY PROTOCOL TO A SAFETY DEVICE

CROSS REFERENCE TO RELATED APPLICATIONS

This application is the National Stage of PCT/DE2013/000255 filed on May 8, 2013, which claims priority under 35 U.S.C. § 119 of German Application No. 10 2012 009 494.9 filed on May 14, 2012, the disclosure of which is incorporated by reference. The international application under PCT article 21(2) was not published in English.

The invention relates to a control device for controlling a safety device. Further, the invention relates to the use of an IO link for transmitting a safety protocol from a master assembly to a safety device.

STATE OF THE ART

In the field of machinery and plant engineering as well as in automation engineering numerous standardized field bus systems have proven to provide good alternatives to parallel individual wiring. Here, a plurality of so-called field bus modules is connected to a central control device via a field bus. In turn, terminal devices are connected to the field bus modules. More recently, IO link connections have been used for connecting the terminal devices to the field bus modules. When this is done, the field bus modules take over the function of the IO link master. Terminal devices can be sensors, actuators, display devices, operator devices or smaller drives in machines, for example. In many assembly facilities the space requirements for the cabling/wiring and the switch box for the electrical installation often exceeds the installation space of the mechanical handling system. Almost always the costs for the work hours and the material required for the installation of the hardware for signal transmission to the machine exceed the purchasing costs of the connected binary sensors and actuators. For this reason, with view to avoiding an expensive and complicated wiring and to reducing costs, sensors with analog signals or serial interfaces, multi-channel parameterizable sensors or devices having diagnostic functions are often dispensed with, even if it would actually be favourable to use them.

In order to tackle this problem, a consortium of involved manufacturers has specified a new standard for a more intelligent sensor/actuator interface which is called "IO link". It is planned that IO link is to be standardized as an international open standard in the norm IEC 61131-9. IO link devices are described through description files IODD, IO link Device Description. As a description language, IODD is to be standardized as an open standard in the norm ISO 15745. An IO link is a serial point-to-point connection for signal transmission between sensors and actuators and the IO level of the machine. In principle, IO link transmits data between an IO link master and a connected IO link device as the slave. Field bus modules as well as SPS interface assembly groups are available to be used as an IO link master. IO link is downward compatible to binary standard sensors and generally uses unshielded three or five-wire standard cables. While the field bus level is responsible for interconnecting individual machines or their components with the control system of the plant, the IO link is assigned to the machine or sensor actuator level. The field bus level comprises most of the standardized field busses such as are generally used in machinery and plant engineering. Commonly used field busses are, for example, PROFIBUS-DP, Interbus, DeviceNet, CC-Link and CANopen. More recently, also Ethernet-based field bus standards such as PROFINET, EtherNet/IP, EtherCAT as well as Ethernet POWERLINK have been used. Field busses are used in a particularly advantageous manner for bridging greater distances between individual participants, which can lie between several 100 meters up to sometimes more than 10 km. However, it is a problem and disadvantage that it is practically impossible to use these high-performance bus systems in an economically viable manner on the sensor/actuator level.

Apart from the purely functional signals, there are also always signals to be found in a machine which are related to security and which serve for providing security for people as well as for the appliance. Commonly used safe signals come from safety devices and safety switches, such as door safety switches, door lock switch devices, light curtains, emergency stop switches etc. In the following, the term "security devices" always refers to such safety devices and safety switches.

Just as is the case for purely functional signals, when it comes to safe signals, too, the question arises as to what is the adequate form of transmission. Field-bus-based solutions are available on the market, but they are comparatively complex. What is frequently found is a parallel wiring of safe signals, which, however, involves a high expenditure of labor and often results in a confusingly complex cabling systems. Besides, there are also safety devices having a medium complexity which need to be parameterized.

Thus, the invention is based on the objective to further develop a control device for controlling of a safety device, which can be connected to a master assembly via a IO link in such a way that it also facilitates the transmission of safe signals, while at the same time performing this with as little technical expenditure as possible and also without having to provide additional cabling.

In particular, it should also be possible to transmit safety-relevant signals by utilizing commonly used safety protocols which allow for the transmission of safe signals via existing communication structures. Such protocols are, for example, PROFIsave, CIPsafety, OpenSafety, CC-Link safety, etc.

DISCLOSURE OF THE INVENTION

Advantages of the Invention

The control device according to the invention has the advantage of being designed in such a way that a safety protocol can be transmitted via an IO link connection. In other words, the IO link connection itself is used to transmit a security protocol. In this manner, additional cabling which serves for the transmission of safe signals can be dispensed with.

By means of the measures that are specified in the dependent claims, advantageous further developments and enhancements of the control device as it is indicated in the independent claim is possible. Thus, as envisioned in a very advantageous embodiment, the IO link connection serves as a black channel. In this way, the IO link connection can be used for transmitting any desired safety protocol, since it only serves as a medium for transmission, that is, as a so-called black channel. The great advantage of the solution according to the invention consists in the fact that a safe IO link device transmits safe data via the IO link connection or, in short, the IO link by using one of the commercially available safety protocols, while it is also possible to transmit additional, non-safe data simultaneously, if that is required. What is particularly advantageous in this method for transmitting safe signals is that the IO link master can remain a standard master, that is, it does not have to be a safe device, since the entire transmission distance from the safety device, which can be connected to a master assembly by using an IO link and which will be referred to in short as an IO link device in the following, up to the safe control can be regarded as a black channel, which means that the IO link master is part of the same and thus does not have to meet any special security requirements.

What is also extremely advantageous is the fact that the safety devices can be supplied with energy via the IO link connection. In this manner, additional separate power cables can be economized, thus reducing the expenditure associated with wiring and consequently saving in material and installation costs.

In addition to this, one advantageous feature that can be provided is that device statuses of the safety device or of the devices connected to the safety device can be sent and/or received via the IO link.

Moreover, one advantageous feature that can be provided is that the safety device is configured for sending and/or receiving at least one signal or data via the IO link connection (e.g. a measured value from a sensor or identification and diagnostic data).

Furthermore, one advantageous feature that can be provided is that the safety device supplies identification data, based on which the manufacturer as well as the type of safety device that is equipped with the IO link device can be identified. Especially when it comes to safety applications, it is very advantageous if the devices can be identified. Thus, in a servicing situation, for example, a replacement device that a defective device has been exchanged with can be identified and, if necessary, rejected if its identity is not correct.

Further, one advantageous feature that can be provided is that the safety device is configured for sending and/or receiving at least one parameter via the IO link connection, wherein the transmission of safe parameters can also be carried out by means of suitable measures.

According to another embodiment, the safety device can be realized in the form of an adapter which has safe inputs to which conventional safety devices as they are available on the market can be connected via their native interfaces such as OSSD, or multi-channel mechanical contacts can be connected.

Moreover, according to an advantageous design feature it can be provided that the safety device, that is, the IO link device, is realized in the form of an adapter having safe outputs to which any desired actuator can be connected, which can be switched off in a safe manner via the safe outputs.

In addition, it can be provided according to an advantageous design that the safety device is realized in the form of an adapter having safe outputs to which any kind of actuator can be connected, which can be switched off in a safe manner via the safe outputs and which facilitate a feedback to the adapter via forcibly actuated contacts in order to satisfy the requirements of higher safety performance levels. In this case, the adapters comprise additional inputs, so-called EDM inputs (external device monitoring).

Finally, it can be provided that the safety device is configured for sending and/or receiving at least one diagnostic information via the IO link connection.

In contrast to other serial interfaces such as RS-232 or USB, IO link does not require shielded cables and, what is more, is downwards compatible to binary sensors with three-wire bonding and actuators with 3- or 5-core connections that are not IO link enabled.

The solution according to the invention provides the use of an IO link for the purpose of transmitting a safety protocol from and to a master assembly [and] from and to a safety device. Here, it is advantageously provided that the safety protocol is transmitted via IO link data bits which serve as a black channel. In this context, it is very advantageous that during the transmission of safe signals from a safety device to a master assembly via the IO link connection, the IO link transmission protocol that is known in itself is made use of, so that—as has already been explained above—the master assembly itself does not have to be a safe device, since the transmission distance from the safety device, that is, the IO link device, to the safe control is regarded as a so-called black channel.

SHORT DESCRIPTION OF THE DRAWINGS

Embodiments of the invention are shown in the drawings and are described in more detail in the following description.

In the figures:

FIG. 1 shows a schematic representation of a control device in which the invention is made use of.

FIG. 2a, 2b shows a schematic representation of the use of the IO link data bits as a black channel for a safety protocol.

EMBODIMENTS OF THE INVENTION

Figure 1:
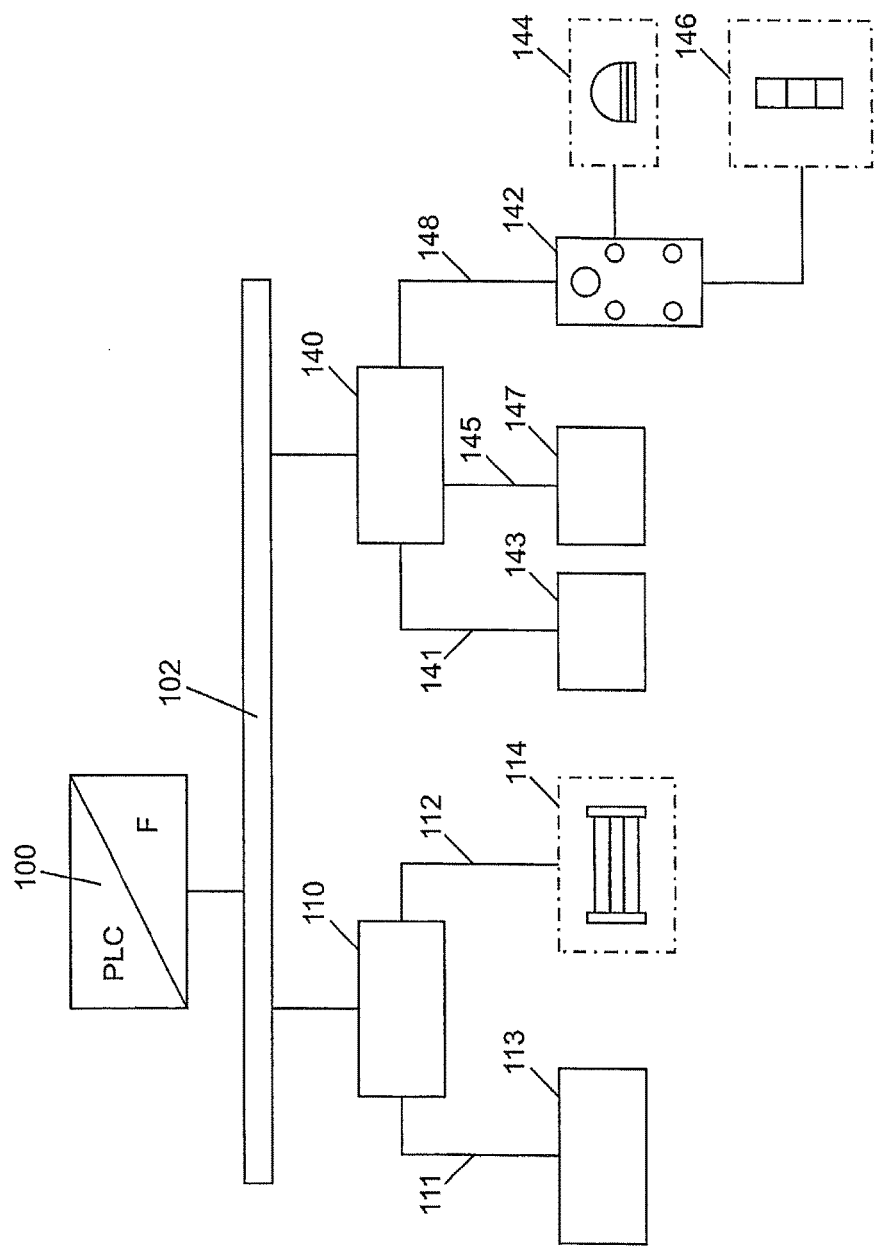

FIG. 1 schematically shows a control device for controlling terminal devices that are realized in the form of IO link devices. A central control device, a controller 100, is embodied as a PLC (programmable logic control), for one thing, and, for another thing, as a F control device (fail safe control device). This means that the controller 100 is able to control ordinary terminal devices as well as safety devices, or it can process their data. Master assemblies 110, 140 are connected to this central controller 100 via a field bus 102, wherein an IO link device 113, which is not relevant with regard to safety, i.e. which is not a safety device, is connected via an IO link connection 111. Further, a safety device 114, for example a light curtain, a light grid, a transceiver, a light barrier, a laser scanner etc., is connected via an IO link connection 112. FIG. 1 shows a schematic representation of a light curtain. This light curtain can be arranged in a safety-relevant area of a machine, for example, and is supposed to ensure that the machine cannot be operated when a person is situated in the area of the light rays of the light curtain.

Other IO link devices 143, 147 that are not relevant with regard to safety, such as, for example, a RFID reading device, a measuring device or the like, are connected to the other master assembly 140 via IO links 141, 145. In addition, a safety device 142 is connected via an IO link connection 148, which may, for example, take the form of a distributor having safe inputs and outputs, to which an emergency stop switch 144 or a hydraulic valve 146 may be connected, for example. The actuation of the emergency stop switch 144 is a safety-relevant control parameter, as is controlling the hydraulic valve 146 or the interruption of the light rays of the light curtain 114. These safety-relevant signals have to be transmitted to the master assemblies 110, 140 via a safety protocol. It principle, it would be possible to directly connect the safety devices 114, 144, 146 to the field bus 102 (not shown). This, however, would result in enormous installation effort and would also require a plurality of additional cables. To avoid this additional expenditure, the solution according to the invention provides that the safety devices 114, 142 (and thus also 144, 146) are connected to the master assembly 110, 140 via IO link connections 112, 148, wherein the IO link connections 112, 148 are to be used as black channels for the transmission of the safety protocol. How this is done is described schematically in connection with FIGS. 2a, 2b. In FIG. 2a, the IO link data bits which serve for transmitting the per se known IO link protocol are schematically described. In addition to header bits 201, 209 a plurality of areas 210, 220, 230, 240, 250, for example, is provided for the transmission of data signal bits. Data transmission via IO link connections in itself is known. Now such a data bit set of an IO link connection is used as a black channel for the purpose of transmitting a safety protocol. This means that the data bit areas 210, 220, 230, 240, 250, which are reserved for the signal transmissions, are used for the transmission of a safety protocol. Thus, for example, the area 210 can be used as another header, the area 220 as a number, for example, the area 230 as a time stamp, for example, and the area 240 as CRC, for example, and the area 250 as another header, for example. In this case, the IO link connection does not "realize" that a safety protocol is transmitted here. It is only used as a transparent channel, as it were, which is also referred to as a "black channel". Here, the enormous advantage consists in the fact that IO link connections can be used for different safety protocols, such as, for example, PROFIsafe, CIPsafety, OpenSafety, CC-Link safety etc. In any case the IO link connection is used as a black channel.

Secured by means of suitable safety mechanisms, parameterizable IO link devices can also receive safe parameters via the IO link interface. An advantageous design of such a safe IO link device can also switch between the required safety protocols through the use of the IO link parameterization, so that advantageously different system environments can be operated by means of a single device and without needlessly increasing the diversity of types involved. In this way, it not only becomes possible to connect per se known IO link devices, i.e. devices that are not relevant with regard to safety, via IO link connections, but also a connection of safety devices, that is, safety-relevant IO link devices, is facilitated.

What is particularly advantageous in this kind of the transmission of safe signals is that the IO link master, that is, the master assembly, can remain a standard master assembly, meaning that it does not have to be a safe device, since all the transmission paths from the IO link device to the safe control are regarded as a black channel, wherein the master assembly group is part of the same and does not have to meet any particular safety requirements.

The invention claimed is:

1. A system comprising:
    a control device,
    a master assembly connected to the control device via a field bus,
    a safety device connected to the master assembly, and
    an IO link connection connecting the safety device to the master assembly, the IO link connection being standardized in norm IEC 61131-9 and serving as a black channel,
    wherein the control device is configured to control the safety device
    wherein the safety device is configured for sending to the control device and/or receiving from the control device at least one safe signal and a non-safe signal via the IO link connection,
    wherein the at least one safe signal comprises an IO link data bit comprising a first header bit, a second header bit, and a plurality of areas between the first header bit and the second header bit,
    wherein the plurality of areas are reserved for signal transmissions and a safety protocol is stored in the plurality of areas, and
    wherein the safety device comprises an adapter which has safe inputs for connecting other safety devices with native interfaces.

2. The system according to claim 1, wherein the safety device is supplied with energy via the IO link connection.

3. The system according to claim 1, wherein the safety device is configured for sending and/or receiving a device status via the IO link connection.

4. The system according to claim 1, wherein the safety device is configured for sending and/or receiving a parameter via the IO link connection.

5. The system according to claim 1, wherein the safety device is configured for sending and/or receiving diagnostic information via the IO link connection.

6. The system according to claim 1, wherein the safety device has safe outputs for switching off an electrical load in a safe manner.

7. The system according to claim 6, wherein the safety device further comprises an adapter comprising safe outputs and additional external device monitoring (EDM) inputs which facilitate the monitoring of external devices.

8. The system according to claim 1, wherein the safety device has a synchronizable real-time clock.

9. The system according to claim 1, wherein the safety device is configured for sending its identification data via the IO link connection.

10. The system according to claim 1, wherein the safety device is selected from the group consisting of a door safety switch, a door lock switch, a light curtain, a light grid, a transceiver, a light barrier, a light scanner, an emergency stop switch, and a hydraulic valve.

11. The system according to claim 1, further comprising a non-safety related IO link device connected to the master assembly,
    wherein the control device is configured to control the non-safety related IO link device.

12. The system according to claim 11, wherein the non-safety related IO link device is selected from the group consisting of an RFID reading device and a measuring device.

13. The system according to claim 1, further comprising a further safety device with a native interface, the further safety device being connected to the safety device via the native interface and via a safe input of the safe inputs of the adapter of the safety device,
    wherein the control device is configured to control the further safety device.

14. The system according to claim 13, wherein the native interface of the further safety device is selected from the group consisting of an OSSD and a multi-channel mechanical contact.

* * * * *